United States Patent
Monereau et al.

(10) Patent No.: US 8,202,351 B2
(45) Date of Patent: Jun. 19, 2012

(54) LIMITING OF IMPURITY PEAKS

(75) Inventors: Christian Monereau, Paris (FR); Pluton Pullumbi, Versailles (FR); Guillaume Rodrigues, Guyancourt (FR)

(73) Assignee: L'Air Liquide Societe Anonyme pour l'Etude Et l'Exploitation des Procedes Georges Claude, Paris (FR)

( * ) Notice: Subject to any disclaimer, the term of this patent is extended or adjusted under 35 U.S.C. 154(b) by 458 days.

(21) Appl. No.: 12/532,171

(22) PCT Filed: Mar. 20, 2008

(86) PCT No.: PCT/FR2008/050478
§ 371 (c)(1),
(2), (4) Date: Sep. 21, 2009

(87) PCT Pub. No.: WO2008/132377
PCT Pub. Date: Nov. 6, 2008

(65) Prior Publication Data
US 2010/0071551 A1    Mar. 25, 2010

(30) Foreign Application Priority Data
Mar. 22, 2007   (FR) ..................... 07 53986

(51) Int. Cl.
*B01D 53/047* (2006.01)
(52) U.S. Cl. .............. 95/96; 95/11; 95/12; 95/140
(58) Field of Classification Search ............... 95/11, 12, 95/96, 140
See application file for complete search history.

(56) References Cited

U.S. PATENT DOCUMENTS

| | | | |
|---|---|---|---|
| 3,897,226 A | 7/1975 | Doherty | |
| 5,443,623 A * | 8/1995 | Jonas et al. | ..... 95/101 |
| 5,632,162 A | 5/1997 | Billy | |
| 6,605,136 B1 | 8/2003 | Graham et al. | |
| 2002/0010093 A1* | 1/2002 | Monereau et al. | ..... 502/416 |
| 2006/0254425 A1 | 11/2006 | Baksh et al. | |

FOREIGN PATENT DOCUMENTS

| | | |
|---|---|---|
| EP | 0748765 | 12/1996 |
| EP | 1716906 | 11/2006 |
| FR | 2735381 | 12/1996 |
| GB | 2113567 | 8/1983 |
| WO | 9106362 | 5/1991 |

OTHER PUBLICATIONS

Search Report for PCT/FR2008/050478, 2008.
Search Report for FR 0753986, 2008.

* cited by examiner

*Primary Examiner* — Robert J Hill, Jr.
*Assistant Examiner* — Christopher P Jones
(74) *Attorney, Agent, or Firm* — Elwood L. Haynes

(57) ABSTRACT

A process for gas purification or separation intended to produce a gas mixture containing mainly hydrogen and, to a minor extent CO, it being imperative for the CO content to remain below a set value is presented. This invention particularly relates to adsorption processes and even more particularly to processes of the PSA ("Pressure Swing Adsorption") type.

18 Claims, 5 Drawing Sheets

_US 8,202,351 B2_

LIMITING OF IMPURITY PEAKS

This application is a §371 of International PCT Application PCT/FR2008/050478, filed Mar. 20, 2008.

FIELD OF THE INVENTION

The present invention relates to a process for gas purification or separation intended to produce a gas mixture containing mainly hydrogen and, to a minor extent CO, it being imperative for the CO content to remain below a set value. It particularly relates to adsorption processes and even more particularly to processes of the PSA ("Pressure Swing Adsorption") type.

BACKGROUND

PSA processes or units serve to purify or separate a feed gas stream. They generally comprise several adsorbers filled with adsorbent materials that are selective for at least one of the constituents of the feed stream. These adsorbers follow a pressure modulation cycle comprising a succession of phases that define the high pressure adsorption steps of the cycle, of decompression, of extraction of the most adsorbed components and recompression. Generally, the arrangement of the cycle is such that production is provided continuously without therefore having the necessity of providing a storage capacity.

An increasing number of industrial processes will from now on require gases with controlled purity, notably with a high and very high purity. Contamination of these gases with some impurities may bring about dramatic consequences for the unit or installation consuming said gas.

The great majority of PSA units possess regulating means enabling the purity of the product to be maintained at the required specification.

They may for example consist of adapting the cycle time. PSA processes treating synthesis gases $H_2/CO$ ($H_2$ PSA) function at a given feed gas flow rate, with the feed gas charge coming for example from a natural gas steam reforming unit. Shortening the cycle time makes it possible to obtain a purer hydrogen fraction to the detriment however of the extraction yield, that is to say to the quantity of hydrogen actually produced.

Conventionally, the impurity content varies during the production phase. In the case where the gas produced consists of less adsorbable components, for example in the case of an $H_2$ PSA, the concentration $Y_i$ of a given impurity i decreases very rapidly at the start of the production step and increases more slowly towards the end of the same step.

A typical example of these variations is given in FIG. 1 which represents the concentration $Y_i$ of an impurity in molar ppm as a function of the phase time; this extending from a few seconds for PSAs called rapid PSAs (RPSAs) to a few minutes or tens of minutes for more conventional PSAs. The high impurity content at the start of the phase time is explained by the fact that the adsorber in question has just been repressurized by means of a gas coming from an adsorber at the end of the production step. The gas produced in the very first instants therefore has the composition of the gas produced at the end of the production step (mirror effect).

In other units where repressurization is carried out differently, in particular in the case of the final repressurization of the feed gas, it will only be possible to observe impurity peaks at the end of the production step, the adsorbent material becoming saturated with impurities, the latter starting to leave with the production (breakthrough).

Beside these systematic fluctuations, peaks will generally appear from time to time, at the start or end of the step according to the type of PSA, corresponding to accidental contamination. These contaminations are due to the fact that the PSA unit does not react sufficiently quickly to operating changes.

Since the duration of the cycles of PSA units extends from a few seconds for PSAs called rapid PSAs (RPSAs) to a few minutes or tens of minutes for more conventional PSAs, regulation of the units should therefore react very rapidly to inevitable changes to the operating conditions (composition of the feed, pressure, flow rate, temperature, etc), to external conditions, (temperature, atmospheric pressure) and to various parameters such as the time taken to maneuver valves, the degree of opening, etc.

Various means exist for anticipating these accidental breakthroughs of impurities, or at least in order to limit their degree, but no system is totally reliable.

In many applications, it is not the average impurity content that is important but indeed the instantaneous maximum concentration. In point of fact, the impurity in question may, beyond a certain threshold, constitute a poison for the downstream unit, and produce undesirable reactions, condensing or solidifying.

For $H_2$ PSAs, it is generally the case that it is imperative for the CO content to be limited to a value of the order of a few ppm at a maximum in order to prevent poisoning of very costly catalysts. For electronic applications, the majority of impurities should be maintained below 0.1 ppm. The CO content should also be limited in the hydrogen feed of fuel cells.

In the absence of any suitable device, it is advisable to adapt the functioning of the PSA so that the impurity content of systematic or accidental peaks remains below the specified maximum value for the impurity in question. For example, if the maximum permitted value for CO is 5 molar ppm, the corresponding $H_2$ PSA will be regulated so as to obtain a systematic peak at the outlet of the order of 1 to 2 ppm, which will generally give a sufficient margin to pass accidental periodic peaks that will then reach 3 to 4 ppm.

It is self evident that such a type of operation leads to an average impurity content in the production that is much less than the permitted maximum content, here of the order of 0.6 to 0.8 molar ppm.

It is found that in relation to this average content, systematic peaks correspond to CO contents 2 to 3 times higher, while periodic peaks may reach 6 to 7 times this average value. The duration of these peaks for a standard $H_2$ PSA will generally be of the order of a few seconds. More generally, they only represent in duration a small percentage of the phase time of a PSA, of the order of a few per cent.

This average purity excess, made necessary by the presence of periodic or systematic peaks, will obviously result in a much lower hydrogen extraction yield and therefore production losses or conversely in a feed gas requirement greater than the actual requirement.

For other types of units, this will inevitably result in additional energy consumption and in practice always in overinvestment.

Several systems have been proposed for improving the operation of units that should ensure production of a fluid of which one of the constituents is an impurity that must imperatively remain below the predetermined threshold.

Document FR-A-2,735,381 proposes the insertion, between the gas production unit and the user, of a reservoir containing an adsorbent material making it possible to retard the progression of an accidental peak so as to give time to analyze production, to detect the problem and to bring a halt to production that is outside specification. Such a process makes it possible to have less of a margin on the operation of the unit but therefore only partially solves the problem. In point of fact, although it makes it possible to prevent contamination of the downstream circuit in CO, this system leads to cessation of the hydrogen supply coming from the unit as soon as a peak exceeds the permitted maximum concentration.

Document U.S. Pat. No. 3,897,226 proposes to add a complementary adsorber between the gas production unit and the user, and to purify gas coming from the main unit with this adsorber as soon as the concentration of impurities exceeds a given threshold. Here also, this device makes it possible to manage accidental peaks or those being produced at sufficiently long time intervals. The system is complex in the sense that it is necessary to control the streams coming toward the adsorber and bypassing the adsorber so as to remain below the impurity threshold limit.

Document GB-A-2,113,567 proposes to add an adsorber in series with the main adsorption cycle, purifying production gas coming from the main unit in a complementary manner as soon as the latter is no longer at the required specification. This complementary adsorber is regenerated at each cycle jointly with one of the adsorbers of the main unit. This system makes it possible to limit systematic impurity peaks, but at the price of considerable complication of the main unit. This system makes it possible to respond with difficulty to the most usual case of systematic peaks at the start and end of the production step.

A certain number of PSAs have several adsorbers in production simultaneously. This is the case for example for $H_2$ PSAs that process large gas flows for which 2, 3, 4 or even more adsorbers provide hydrogen simultaneously. Since each of the adsorbers has commenced its production cycle at a different moment, production is in some way automatically averaged out. Such a system effectively reduces the relative size of systematic or accidental peaks but does not eliminate this effect.

Finally, EP-A-748 765 describes the installation of a reservoir containing an adsorbent material having an affinity for carbon monoxide, between a unit for purifying carbon monoxide by adsorption for stopping water and $CO_2$ and a cryogenic separating unit. The object of this unit is to regulate the carbon monoxide stream which varies cyclically: the adsorbent material provides CO when the production flow rate becomes reduced and stores CO in the opposite case. The reservoir acts as a storage capacity. In this case there is a variation of the order of a % about the average characteristics. On the contrary, the CO content in this method is not limited in pure hydrogen to the ppm level. It is no longer envisaged that fluctuations of CO content will be dealt with that may reach, or even exceed, 6 to 7 times the average content in production. It is said that the adsorbent could be a molecular sieve, in particular the same adsorbent as that used in the main purification.

As regards the stopping of CO in $H_2$ PSA units, U.S. Pat. No. 6,605,136 teaches that in order to stop CO in hydrogen, it is possible to select one or more zeolites with or without a binder belonging to those chosen from CaA, NaX, CaX, BaX, LiX, NaLSX, CaLSX, BaLSX and LiLSX.

It is also disclosed that, according to the supply period, particles of different dimensions should be used.

It is thus recommended for example that particles are used of 0.3 to 0.8 mm diameter for adsorption periods of 0.25 to 30 seconds and of 1.2 to 1.6 mm for adsorption periods of 7 to 120 seconds.

In addition, US-A-2006/0254425 indicates that the main part of CO may be preferably adsorbed in a layer of high density active carbon, but that exchanged zeolites of the A, X, Y type, chabazite, mordenite, etc may be used. It also teaches that the residual CO content will advantageously be stopped by zeolites of the CaA, LiX, CaX, LiLSX, CaLSX, Li-mordenite, Ca-mordenite type etc. It is stated that adsorbents having a Henry constant for CO greater than 2.94 (mmol/g)/bar are preferred. It is also stated that a substance having a Henry constant greater than 10 (mmol/g)/bar adsorbs the compound to be stopped too strongly to be used in a PSA.

Finally, document EP-A-1 716 906 that claims, for an $H_2$ PSA unit intended to stop CO, an adsorbent is to be used having a Henry constant for CO between 2.5 and 5.5 (mmol/g)/bar, a unit approximately equivalent to the unit previously used (mmol/g)/bar. From table 4, it will be seen that use will preferably be made of a 5A zeolite exchanged with between 70 and 95% calcium, of 5A without binder exchanged with between 60 and 91% and of BaX. The use of X zeolites and of 5A that is exchanged to too great an extent or is not exchanged enough with calcium will be avoided.

From this, it may be summarized that, in order to stop CO traces in a PSA, a large number of adsorbents may be used, provided that they adsorb CO sufficiently but not too much, that is to say an adsorbent having a Henry constant preferably within the range of 3 to 5 (mmol/g)/bar. In addition, the more rapid the cycle, the more small-size adsorbents will be used in order to increase the kinetics.

However, the state of the art does not disclose a simple method for limiting, at the same time, systematic impurity peaks and accidental impurity peaks of CO in the form of traces in hydrogen, knowing that these may conventionally reach concentrations that are a minimum of 6 to 7 times higher than the average CO concentration. In the hypothesis where a storage capacity would be installed in series with the PSA, the state of the art no longer states what adsorbent would be more effective, in particular if the adsorbents already used in the PSA are particularly suited or not to this role of limiting CO peaks.

Starting from this, a problem that is presented is to provide a simple application process employing an adsorbent material making it possible to ensure hydrogen production with a CO content that must be below a given value.

One solution of the invention is a purification or separation process for a stream of feed gas containing hydrogen $H_2$ and a molar content of carbon monoxide (CO) greater than or equal to 1000 ppm, wherein:

a) said feed gas stream is introduced continuously into a first purification unit (10) of the PSA type containing a first adsorbent on which CO is preferably adsorbed;

b) the gas coming from step a) is recovered, at least partially purified of CO and having an average CO molar content T less than or equal to Tacc, it being itself less than or equal to 100 ppm and from time to time a first maximum CO content $TM_0$ greater than Tacc;

c) all the gas coming from step b) is introduced continuously into a downstream adsorber (20) containing at least one second adsorbent (21) on which CO is preferably adsorbed;

d) the gas enriched in $H_2$ coming from step c) is recovered having an average CO content T and a maximum CO content $TM_1$, both being less than or equal to Tacc.

Tacc is the acceptable CO content for the downstream process. Tacc is preferably less than 50 ppm, even more preferably less than 25 ppm and even more preferably less than 10 ppm.

According to the case, the process according to the invention may have one of the following features:

in step d) the maximum CO content $TM_1$ is such that $(TM_1-T)<\frac{1}{2}(TM_0-T)$, preferably $(TM_1-T)<\frac{1}{5}(TM_0-T)$, still more preferably $(TM_1-T)<\frac{1}{10}(TM_0-T)$;

in step b) the maximum CO content $TM_0$ is such that $TM_0 \geq 1.1 \times T$, preferably $TM_0 \geq 2 \times T$;

in step c) the second adsorbent has, at 20° C., a Henry constant for CO greater than or equal to 2.5 (mmol/g)/bar, preferably greater than or equal to 5 (mmol/g)/bar;

the first and second adsorbents are either identical or different when the second adsorbent has adsorption kinetics less than that of the first adsorbent;

the second adsorbent is of the granular type, in particular in the form of beads or rods, while the first adsorbent is of the monolithic type, in particular in the form of sheets;

the second adsorbent is chosen from an X zeolite, preferably an LSX zeolite, a 5A zeolite or an exchanged zeolite, in particular a zeolite exchanged to the extent of more than 50%;

the downstream adsorber contains at least two different adsorbent materials;

the feed gas stream is obtained by steam reforming, by partial oxidation of hydrocarbons or alcohols, by gasification of coal or residues, or by mixed processes;

gas coming from step d) is intended for a network of the pipeline type, a chemical unit, a petrochemical unit, a unit forming part of a refinery or for feeding a fuel cell.

The invention will be described in greater detail by means of FIGS. 2 to 5.

In FIG. 2, the unit 10 represents a feed gas purification unit 1. This unit is for example a hydrogen PSA processing a charge flow rate of 165,000 $Nm^3/h$ of a gas coming from steam reforming, at a pressure of 20 bar abs and a temperature of 35° C. and having a composition corresponding to 70 mol % $H_2$, 22 mol % $CO_2$, 4 mol % $CH_4$ and 4 mol % CO (dry gas).

SUMMARY OF THE INVENTION

This purification unit 10 makes it possible to eliminate virtually all the $CO_2$, $CH_4$ and CO.

The adsorbent used as the last bed for stopping the CO is a commercial adsorbent of the 5A type, available from suppliers such as UOP, CECA or Zeochem.

The production stream 2 from this unit consists of a little more than 100,000 $Nm^3/h$ hydrogen with a residual content of carbon monoxide varying regularly between 0.5 and 1.5 ppm and periodically having peaks around 3 to 4 ppm.

Such an operation makes it possible to ensure hydrogen production with less than 5 ppm CO over long periods of time but of course does not make it possible to meet the specification of the maximum of 1 ppm. The $CO_2$ and $CH_4$ content is, under these conditions, less than ppm and does not present any problem as regards the hydrogen purity specification.

This production 2 is introduced in its totality and continuously in a downstream adsorber 20 containing a second adsorbent 21.

Leaving the downstream adsorbent 20, the fluid 3 has a CO content practically constant around 0.8 ppm, remaining in practice within a concentration range of 0.75/0.85 ppm.

FIG. 5 shows that the downstream adsorber 20 containing the second adsorbent 21 acts as a peak limiter as regards impurity peaks. In point of fact, a first curve A gives the concentration in molar ppm of the gas stream entering the adsorber 20 with time in minutes. A second curve B gives the concentration of impurities in molar ppm in the gas stream leaving the adsorber 20 with time in minutes and a third curve C gives the average concentration of impurities in molar ppm of the gas stream leaving or entering the adsorber 20 with time in minutes. From this, it will be seen that the curve B does not have the amplitude in ordinates of the curve A and tends to approach the curve C. In fact, as soon as a CO peak appears, the CO partial pressure increases and, consequently, the quantity of CO adsorbed increases locally as the peak passes. This has the effect of readsorbing the CO peak. The gas behind this peak is rich in hydrogen $H_2$ which produces a "flushing out" of the previously adsorbed CO in the region of the peak (the adsorbed CO is eluted by the gas enriched in $H_2$). This adsorption/elution coupling explains the propagation of the impurity peak through the bed. This phenomenon is known in applied chromatography but here, instead of wishing to preserve and/or isolate peaks, the reverse effect is sought, namely a spreading effect (FIG. 8).

According to whether the adsorption kinetics are more or less slow, CO will pass more or less quickly from the adsorbed phase to the gas phase. This retardation of transfer between the two phases makes it possible to spread out the impurity peak. It will be noted that too low adsorption kinetics will discourage the spreading out of peaks in the sense that the impurity peak will be moved through the adsorber without CO being adsorbed and the peak will then be deformed to a very small extent. On the contrary, with too rapid adsorption kinetics of the type used in chromatography, the CO peak will be instantaneously adsorbed and flushed out. The retarding effect of the adsorbent will then be reduced and the peak will be spread out to a lesser extent.

The process according to the invention makes it possible, without fear of contamination, to reduce the margins selected in the state of the art on the operation and to regulate the PSA employed in step a) for producing hydrogen with an average CO molar content of 0.8, that is 3 to 4 times higher than the initially provided adjustment (of the order of 0.2 ppm) without addition of the downstream adsorber 20. Such a modification makes it possible to produce approximately 500 $Nm^3/h$ or to reduce the necessary feed flow rate, that is to say the consumption of natural gas, while more surely meeting the conditions as regards the maximum CO content.

It will be noted that a small volume of adsorbent 21 is sufficient to moderate the impurity content of the gas in a very effective manner from the moment the adsorbent is judiciously chosen. In the case of the example, a few $m^3$ of adsorbent are sufficient to smooth the production of a PSA producing more than 100,000 $Nm^3/h$ of hydrogen.

Taking into account the total absence of data that may be used for determining the size of such a unit, as well as indications that might let it be considered that such a system could respond to the problem presented, the choice of adsorbent has been the subject of a series of tests that have led to demonstrating the two essential features that this adsorbent should exhibit in order to respond to said problem, that is to say to be capable of suppressing CO peaks and smoothing the production content.

DETAILED DESCRIPTION OF THE INVENTION

Figure 1:
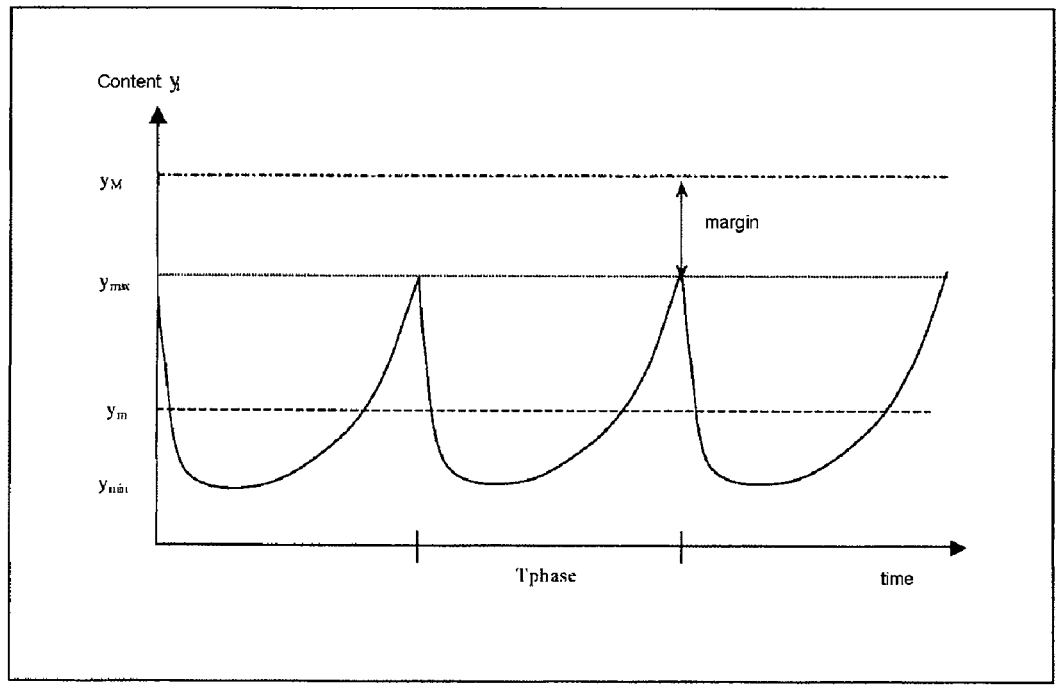
FIG. 1 illustrates the concentration Yi of an impurity in molar ppm as a function of the phase time.
Figure 2:
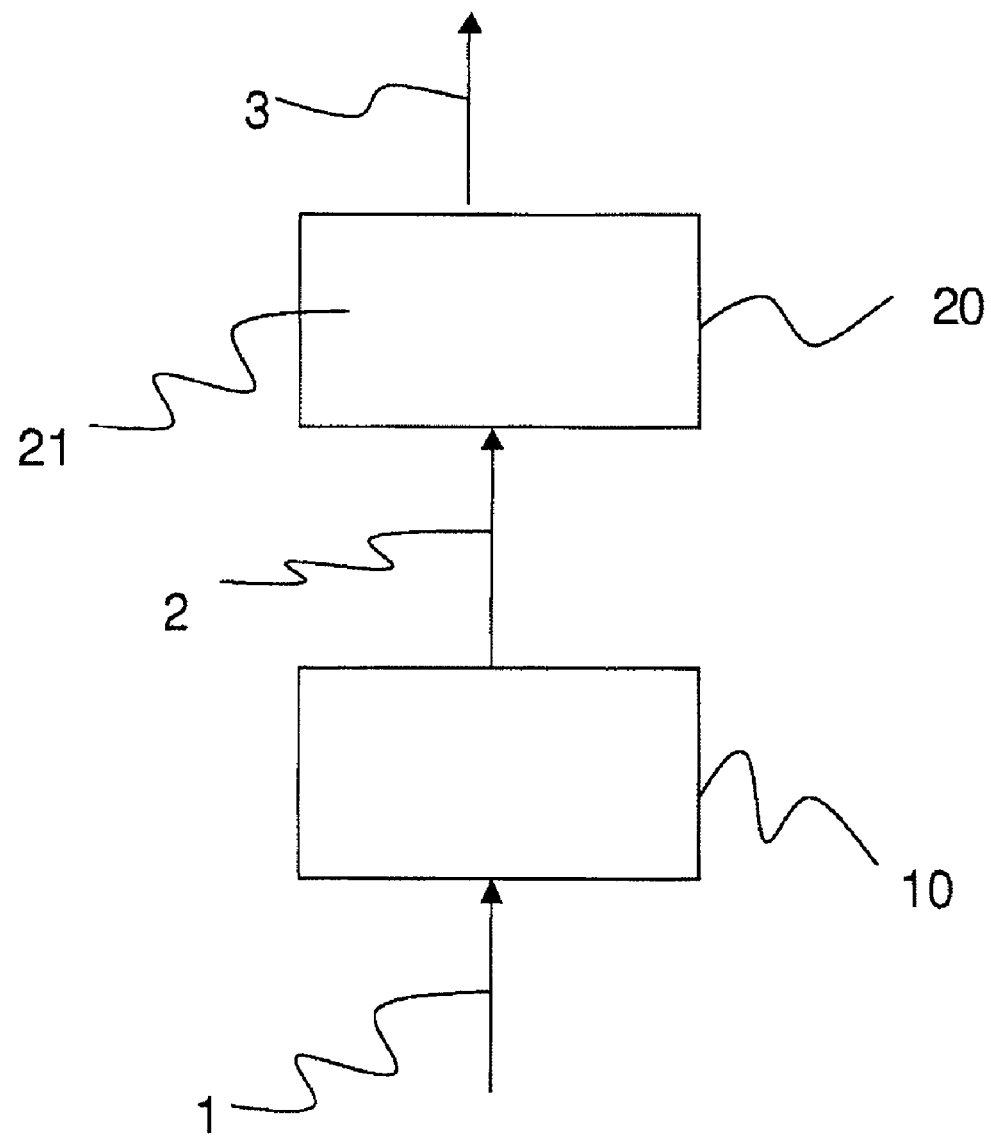
FIG. 2 illustrates one embodiment of the present invention.

For a further understanding of the nature and objects for the present invention, reference should be made to the detailed description, taken in conjunction with the accompanying drawing, in which like elements are given the same or analogous reference numbers and wherein:

The first tests have consisted of determining the Henry constants of various adsorbents including those conventionally used in PSAs for stopping CO (13X, 5A etc) and then the adsorption kinetics for CO under operating conditions, these parameters appearing to be fundamental for the adsorption of traces of CO in any case in PSA units.

Simulation has then been used in order to see the effect of one or other parameter (Henry constant and kinetics) with a view to attempting a solution of our problem.

In applications where the size-determining impurity is in the form of traces, that is to say when its partial pressure is low, the Henry constant effectively proves to be the right parameter for characterizing adsorption. "Size-determining impurity" is understood to mean that the impurity that is to be stopped at the required level determines the performance of the adsorption unit. In the case that interests us, it consists of CO. The Henry constant is the ratio of the adsorption capacity Q to the adsorption pressure P when said pressure P tends to zero.

As it was not possible to carry out measurements at zero pressure, a procedure had to be defined for determining this value.

Since the initial state of the adsorbent is a determining factor for the adsorption of traces, samples were regenerated from 350° to 450° C. according to the type of zeolite, under a vacuum of $10^{-5}$ mbar for 8 hours.

The adsorption of CO was measured so as to obtain a dozen measurement points regularly spaced within the partial pressure zone that could be easily obtained in a laboratory possessing suitable equipment and in this way points were obtained at partial pressures of 1 mbar to 1 bar at a temperature of 20° C.

The constants of the Langmuir equation $$Q = A \times \frac{P}{(1 + B \times P)}$$

(equation 1) were determined by means of a solver of the Excel® type, which minimized the relative deviation between the measured points Xi and the calculated points Yi, that is to say that minimized the sum of the values of $$\frac{(Yi - Xi)^2}{Xi^2}.$$

The Henry constant is defined by H=A.

The unit selected for H was (mmol/g)/bar, namely a millimole of CO adsorbed per gram of adsorbent per bar.

The zeolites tested were essentially commercial zeolites from UOP, CECA, Zeochem, Axens etc.

The tests and their subsequent processing led to the following results for a temperature of 20° C.:

Zeolite 13X: H between 1.8 and 2.7
Zeolite 5A: H between 4.4 and 8.8
Zeolite CaX: H between 12 and 18
Zeolite LiLSX: H of the order of 20
Zeolite CaLSX: H of the order of 25

It will be noted that in view of the tests carried out, adsorbents of the Heulandite, Chabazite or Mordenite type possessing a low Si/Al ratio, that is to say less than 10, are suitable for the process according to the invention.

It will be seen that the various zeolites have Henry constants varying over more than an order of magnitude. In addition, the values determined according to the described procedure appear to be a little higher than other values found in the literature.

There may be a difference between the adsorbents themselves, even if they belong to the same family, for example X zeolites that correspond to a structure of the faujasite type of which the Si/Al ratio is less than 1.5. It is well known in the literature that by varying the Si/Al ratio from 1 (in this case the structure is known by the name LSX) to 1.5, it is possible to vary the Henry constant continuously. The type of cation may also play a major role on the Henry constant, for example for the A family of zeolites (LTA) the Si/Al ratio is fixed and equal to 1, and variations in the Henry constant observed are derived from the nature of the cations present.

The activation state of the product may also be involved, traces of humidity having a large effect on the adsorption of traces. An indication of the activation state of the adsorbent is not always stated in documents, making any direct comparison impossible.

Finally, the determination procedure itself may be involved. The hypothesis is currently made that at low pressures that are easily measurable in the laboratory the isotherm is linear, which is not generally the case, in particular with adsorbents having high energy heterogeneity. Use of the procedure described above makes it possible to take the residual curve into account at low pressures measurable via the coefficient B of equation (1). This automatically leads to higher values for the slope at the origin of the isotherm, that is to say for the Henry constant. In point of fact, for the same value of Q, B not being zero, A should have a higher value in order to compensate for the increase in the value of the denominator.

As regards the kinetics, these are determined by processing a breakthrough curve. Such a procedure is described in the literature and only the main lines are described below. The adsorbent to be tested, regenerated as previously stated, is placed in a column of a sufficient size so that, on the one hand, the edge effects are negligible (a diameter is selected 10 times the equivalent diameter of the particles) and so that, on the other hand, the inlet effects are also negligible (a sufficiently large length will be selected so that the quantities of CO in free volumes are low compared with volumes of adsorbed CO).

The adsorbent is first of all swept with pure hydrogen under the selected operating conditions, here 25 bar abs and 20° C., and the composition entering is changed as quickly as possible, here by introducing a few tens of ppm of CO in hydrogen while keeping the other operating conditions (pressure, temperature) constant.

The breakthrough curve of CO is recorded and then simulated with the aid of a suitable simulation program. The program used for simulation rests on the principles of conservation of mass (including axial dispersion), of the conservation of enthalpy (non-isothermal) and of the conservation of the amount of movement, and uses the Fick model (see "Principles of adsorption and adsorption processes", John Wiley & Sons, 1984; D. M. Ruthven; or "Gas separation by adsorption processes", Butterworth, 1987, Ralph T. Yang), unsimplified by the LDF (Linear Driving Force) formula, for the fine evaluation of the kinetics of solid-gas transfers within the adsorbent mass. Such simulation models are notably described in Pressure Swing Adsorption, Ruthven, Farooq and Knaebel, VCH Publishers, 1994, pages 172-209; and in Fluid Flow Through Packed Columns, S. Ergun, Chem. Engr. Prog., 48(2), 89(1952). As regards these equations, these may be solved for example by an internal code or by means of the ADSIM program marketed by Aspentech™. A person skilled in the art will be perfectly able to choose a suitable simulation program from the many programs available on the market and to introduce the following data therein.

Equations of the isotherms of hydrogen and of CO will be used, determined from the experimental points, as stated above for CO (equation 1).

As an indication, a procedure of the same type is described in U.S. Pat. No. 6,605,136, columns 5 and 6.

The kinetic coefficient K ($s^{-1}$) is adjusted, with the aid of the previously described program, until the simulation and the experimental curves are in agreement. Experimental breakthroughs are carried out for several flow rates of increasing size until a constant coefficient is obtained. In this way, it is ensured that the kinetics concerned are really those associated with the adsorbent and not with the film resistance due to too low a speed of passage through the bed. This film resistance could be taken into account by a model implemented in the simulation but precision as regards the intrinsic kinetics would then be less. Under experimental conditions such that the resistance to transfer of a substance through the outer film of the bead is negligible, it will be seen that by using particles of different sizes for the same product, the main resistance is of the macropore type, that is to say the kinetics vary in an inverse manner proportional to the square of the diameter of the particle.

That is to say there will be a factor of 100 between a particle of 0.5 diameter and one of 5 mm diameter.

Taking into account the differences already observed between products and providers, variations may largely exceed these two orders of magnitude.

Moreover, for RPSAs employing very rapid cycles, the adsorbent will generally be in the form of rolled sheets impregnated with zeolite crystals, in the form of a fabric, and more generally in the form of a monolith with equivalent diameters of the order of 0.1 mm or less.

In a general manner, the kinetics used in RPSAs are between 5 and 1000 times more rapid than that for conventional $H_2$ PSAs.

The characteristic size of a particle will be defined hereinafter as the diameter of the sphere having the same volume as the particle in question. Other definitions exist but lead to more complex mathematical expressions.

Thus, the characteristic size D or equivalent diameter of the bead is that of a sphere of the same size, whereas that of a cylindrical particle (e.g. pellet or extruded material) of diameter d and length or height l is such that:

$$D^3 = 3/2 \times d^2 \times l$$

For simplicity, the diameter of a crushed material will be defined as that of the smallest sphere containing it.

From this, it is possible to define the average equivalent diameter of a population of particles having unit diameters that are very little different, such as Dm from the equation: $1/Dm = \text{sum } Xi/Di$ where Xi is the volume fraction of the class of particles of equivalent diameter Di.

It is possible to define in various ways the equivalent diameter of a particle as soon as it is not spherical. The important thing is to remain consistent between the interpretation with experimental tests and simulations in order to determine the industrial unit.

The table below shows the impact of the Henry constant of CO on the spread of a peak for 3 given adsorbent volumes, in practice for 3 packing lengths of same cylindrical adsorber reference L/3,L,3L, etc.

The spread factor is defined here as the ratio of the residual deviation leaving the adsorber to the initial deviation.

In practice, in order to have easily exploitable responses, a peak $TM_0$ was created of 10 ppm with a duration of 30 seconds in a fluid of which the normal CO content (T) was 1 ppm, and simulation used in order to determine the maximum concentration at the outlet (TM1). The latter (simulation) made it possible in point of fact to separate effects due to the isotherm (via the Henry constant) from effects due to the kinetics.

The spread factor was thus expressed in the following manner:

$$\frac{(TM1 - T)}{(TM_0 - T)}.$$

The kinetics were kept constant and corresponded to the kinetics measured on a commercial 13X zeolite with an equivalent diameter of 1.6 mm. In practice, these kinetics correspond to industrial adsorbents used in $H_2$ PSAs with equivalent diameters within the range of 1.4 to 2.1 mm.

Reference H/3 corresponds to a 13 X zeolite (Henry constant of 2.23 (mmol/g)bar 50), reference H to a zeolite having a Henry constant of 6.69 (type 5A) and reference 3H to a Henry constant of 20 (CaX or LiLSX).

TABLE 1

Spread factor of a 10 ppm CO peak as a function of the Henry constant and the length of the adsorber at constant kinetics.

| | L/3 | L | 3L |
|---|---|---|---|
| H/3 | 0.29 | 0.17 | 0.09 |
| H | 0.10 | 0.06 | 0.03 |
| 3H | 0.034 | 0.018 | 0.01 |

It was first of all determined that it is possible to spread a CO peak with a ratio greater than or equal to 10 (that is to say with a spread factor 0.1 in the table) by using an adsorber with a sufficient volume with the various sieves tested. The addition of a simple sieve volume downstream from the PSA then made it possible to achieve the desired objective without having recourse to bypass circuits, flow regulations or regeneration steps.

A process is therefore available that is notably simpler than those described in the prior art for this type of problem.

In addition, it is possible to reach high spread factors in all cases, the use of adsorbent having a high or even a very high Henry constant making it possible to reduce the length considerably, that is to say the volume of the adsorber to be used.

Thus, use will be made of a sieve with a Henry constant greater than that of the adsorber or adsorbers used in $H_2$ PSAs, the teaching showing that for these latter units, materials should be used with limited value Henry constants. It would therefore be valuable to use CaX, LiX, LiLSX, CaLSX or possibly 5As having high adsorption characteristics.

However it has also been observed that the kinetics play an important part in the spread factor.

For 3 values of the Henry constant, the kinetics K were varied by more than an order of magnitude, which corresponded in practice to using particles 1 to 5 mm of equivalent diameter. In relation to the kinetics K of the base product, two slower kinetics were thus tested (K/3 and K/9) and more rapid kinetics (3K).

The kinetics reference K/3 corresponded to an adsorbent with an equivalent diameter within the approximate range 2.5/3.5 mm.

As previously, 3 adsorber lengths were tested (L/3, L, 3L). The results obtained appear in tables 2, 3 and 4 below:

TABLE 2

Spread factor of a 10 ppm CO peak as a function of the kinetics and the adsorber length (case of zeolite X)

|  | L/3 | L | 3L |
|---|---|---|---|
| K/9 | 0.42 | 0.10 | 0.03 |
| K/3 | 0.28 | 0.10 | 0.07 |
| K | 0.29 | 0.17 | 0.09 |
| 3K | 0.46 | 0.27 | 0.13 |

TABLE 3

Spread factor of a 10 ppm CO peak as a function of the kinetics and the adsorber length (case of zeolite 5A)

|  | L/3 | L | 3L |
|---|---|---|---|
| K/9 | 0.18 | 0.03 | 0.01 |
| K/3 | 0.1 | 0.03 | 0.02 |
| K | 0.1 | 0.06 | 0.03 |
| 3K | 0.17 | 0.09 | 0.04 |

TABLE 4

Spread factor of a 10 ppm CO peak as a function of the kinetics and the adsorber length (case of zeolite CaX/LiLSX)

|  | L/3 | L | 3L |
|---|---|---|---|
| K/9 | 0.054 | 0.009 | 0.001 |
| K/3 | 0.034 | 0.011 | 0.006 |
| K | 0.034 | 0.018 | 0.01 |
| 3K | 0.062 | 0.03 | 0.016 |

It was found that in order to obtain high spread factors of the order of 10 or more, which made it possible in practice to obtain an almost totally averaged CO impurity content at the outlet from the downstream adsorber 20 in normal operation, it was important to use adsorbents with a high Henry constant and medium or low kinetics.

This means in practice that behind a standard $H_2$ PSA, that is to say with an adsorption duration greater than 30 s, generally within the range 60 to 150 seconds, use will be made, as a preferred adsorbent for the downstream adsorber 20, of an adsorbent having a Henry constant equal to or greater than that recommended for the adsorbent of the PSA, therefore preferably greater than 5.5 (mmol/g)/bar and with kinetics equal to or less than that of the adsorbent of the PSA.

The adsorbent of the PSA is understood to mean the adsorbent or adsorbents intended to stop CO, that is to say in particular the adsorbent constituting the last layer of the bed in an $H_2$ PSA processing a synthesis gas.

Figure 4:
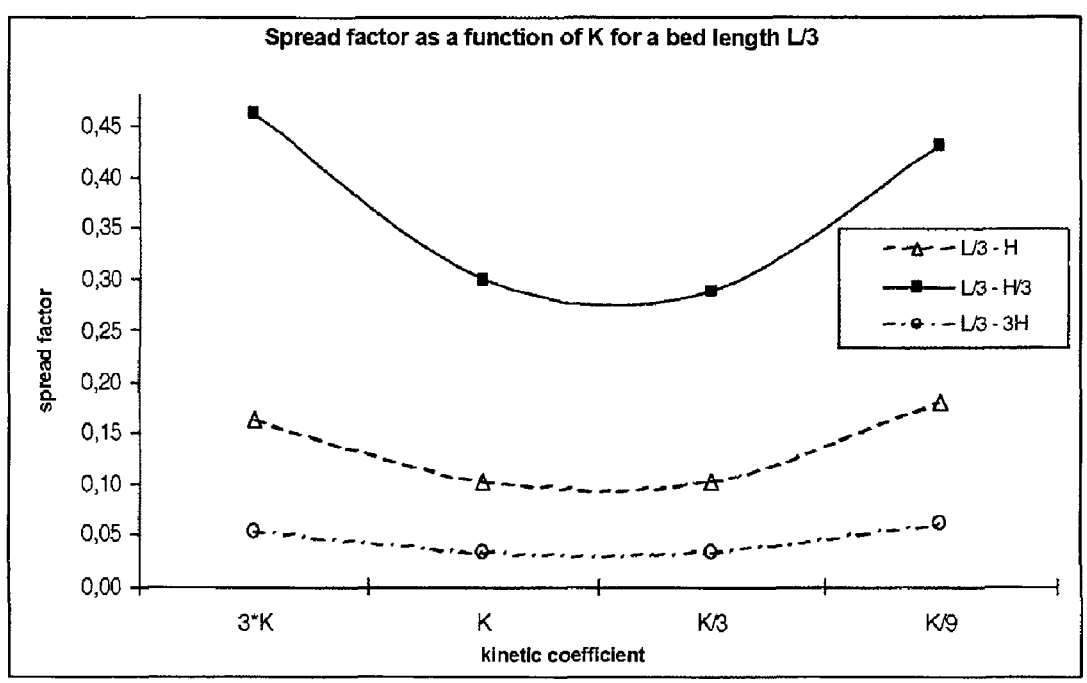
FIG. 4 illustrates another embodiment of the present invention.
Figure 5:
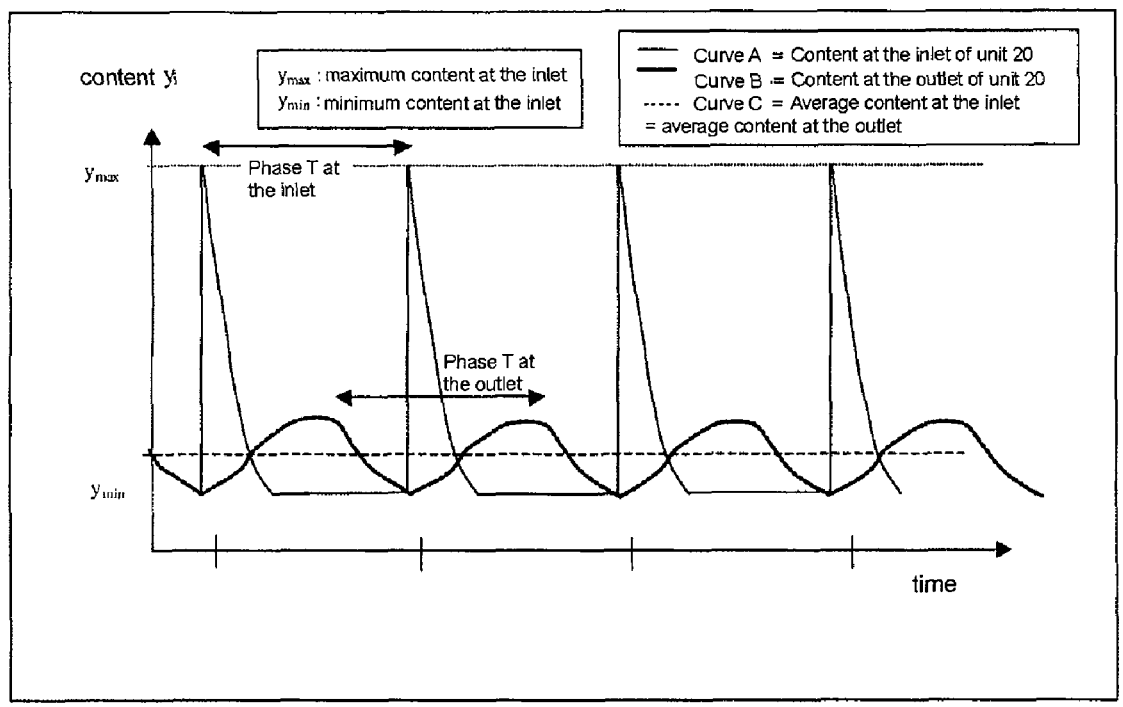
FIG. 5 illustrates another embodiment of the present invention.

In all cases, as already mentioned, the spread factor is lower the greater the bed length. Nevertheless, during dimensioning, the smallest possible volume of adsorbent will be put in place for economic reasons, enabling the desired spread factor to be obtained. In point of fact, for equipment of this size, the difference in cost between zeolites is not a preponderant factor compared with the equipment itself. It will be found in tables 2, 3 and 4 that for the minimum length L/3, optimum kinetics exist minimizing the spread factor. This will be seen in FIG. 4 where a graph is shown representing the spread factor in ordinates and the kinetic coefficient of the shortest adsorbent bed (L/3) in abscissae. Three curves representing the behavior of three types of zeolite are shown on said graph. From this, for a given Henry constant, the adsorbent will therefore be chosen that possesses the most suitable kinetics. The bead diameter or the macroporous volume distribution will be preferably chosen enabling the optimum to be approached.

In practice, in order to obtain a spread factor equal to or greater than 10 with a reduced adsorbent volume, an adsorbent will be used with a Henry constant equal to or greater than 5 (mmol/g)/bar and with a kinetics corresponding to an adsorbent of equivalent diameter within the range 1 to 3.5 mm, preferably between 2 and 3 mm, knowing that the base kinetics (K), as previously indicated, corresponds to industrial adsorbents of diameter 1.4 to 2.1 mm.

For larger particle sizes, in particular above 5 mm, the kinetics becomes too poor and with the selected dimensions, the spread factor increases, and in order to obtain the value of 0.1 very highly adsorbent zeolites are required that are probably not on the market and on account of this are costly. For smaller particle sizes, performance is reduced (increased spread factor) and pressure losses are unnecessarily increased.

For RPSAs, an adsorbent with a Henry constant equal to or greater than the adsorbent of the PSA and with much smaller kinetics will be preferably used as the adsorbent for the downstream adsorbent 20. Particles, beads or rods for example will thus be preferably used, even if the RPSA adsorbent is in the monolith form.

The downstream adsorber 20 will preferably be of the standard type, namely cylindrical with a vertical axis, with downward circulation. The adsorbent charge may be held between two beds of inert beads with a small thickness encouraging the distribution of gases within the adsorbent.

Other types of adsorbers may be used such as a radial adsorber or a cylindrical adsorber with a horizontal axis according to the quantities of adsorber to be installed and the operating conditions.

The installation employed in the process according to the invention may have a particle filter incorporated or not in the downstream adsorber 20, measurements of pressure losses and isolating means for acting if necessary on the downstream adsorber 20.

If necessary, in the case of large or periodic peaks, it is possible to create dwell times with a different duration in the downstream adsorber 20. For this, it is sufficient for example to use two types of adsorbent material of different characteristics and/or offering a feed gas 2 with different path lengths.

Figure 3:
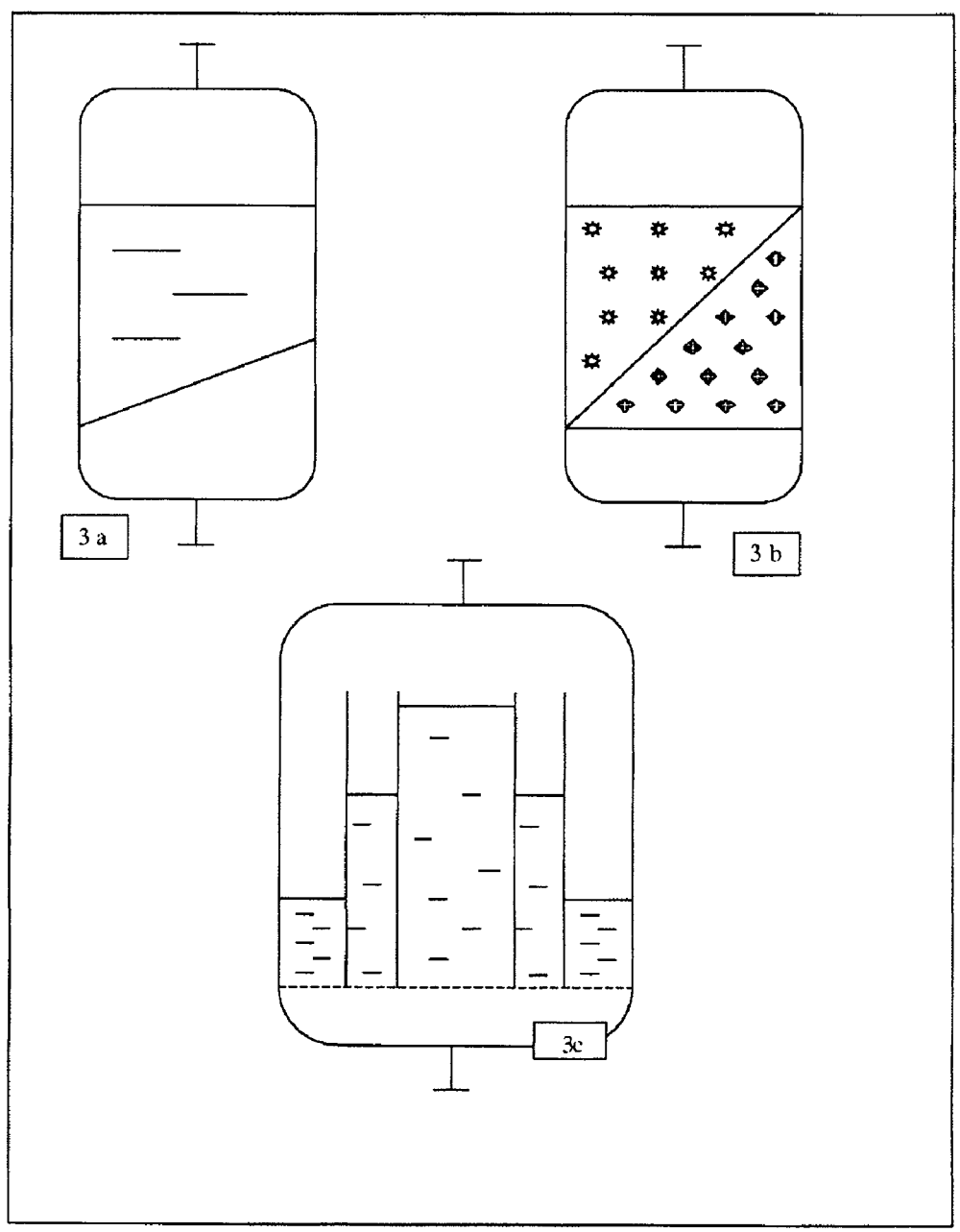
FIG. 3 illustrates another embodiment of the present invention.

A few examples of embodiments are shown in FIG. 3. The adsorbent 3a in which the adsorbent is deposited on an inclined mesh offers different paths for the gas.

The adsorber 3b is filled with two different materials separated by an inclined mesh. Preferably, in order to facilitate the calculation, two adsorbents will have a common particle size. The local speeds will then be identical in the same section. One of the two adsorbents could be a 3A zeolite inert to CO. The adsorber 3c contains concentric cylinders. The spaces between cylinders are filled with different adsorbents or with the same adsorbent but with different heights.

From this, it is possible to design various adsorbent systems combining different materials and/or paths in order to encourage the limiting of impurity peaks. It goes without saying that such systems are more complex to dimension than a single bed of adsorbent and will only be used if simple peak limitation via a conventional adsorber proves to be insufficient.

The invention is described and claimed within the context of an $H_2$ PSA having a maximum CO content specification in hydrogen that may extend as far as 100 ppm. This is at the present time an important process having this type of constraint due to the uses of hydrogen. It is self evident that at present such an approach will be extended to other means of gas production having unacceptable impurity peaks for the downstream process. It may also be used if the gas produced is the most adsorbable gas. In this case, the content of a lighter gas (less adsorbable) considered as an impurity, will also exhibit variations during the production phase.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. a process for purifying or separating a feed gas stream containing hydrogen $H_2$ and a molar carbon monoxide (CO) content greater than or equal to 1000 ppm, comprising:
a) introducing the feed gas stream continuously into a first purification unit of the PSA type containing a first adsorbent on which CO is preferentially adsorbed, thereby producing an at least partially purified gas stream having an average molar CO content T less than or equal to Tacc, said at least partially purified gas stream having a CO content of less than or equal to 100 ppm, and periodically having a first maximum CO content $TM_0$ greater than Tacc; b) recovering said at least partially purified gas; c) introducing said recovered at least partially purified gas continuously into a downstream adsorber containing at least one second adsorbent on which CO is preferentially adsorbed, thereby producing a gas enriched in $H_2$ having an average CO content T and a maximum CO content $TM_1$, both being less than or equal to Tacc; d) recovering said gas enriched in $H_2$.

2. The process of claim 1, wherein in step c) the maximum CO content $TM_1$ is such that $(TM_1-T)<\frac{1}{2}(TM_0-T)$.

3. The process of claim 2, wherein the maximum CO content $TM_1$ is such that $(TM_1-T)<\frac{1}{5}(TM_0-T)$.

4. The process of claim 2, wherein the maximum CO content $TM_1$ is such that $(TM_1-T)<\frac{1}{10}(TM_0-T)$.

5. The process of claim 1, wherein in step a) the maximum CO content $TM_0$ is such that $TM_0 \geq 1.1 \times T$.

6. The process of claim 5, wherein in step a) the maximum CO content $TM_0$ is such that $TM_0 \geq 2 \times T$.

7. The process of claim 1, wherein in step c) the second adsorbent has, at 20° C., a Henry constant for CO greater than or equal to 2.5 (mmol/g)/bar.

8. The process of claim 7, wherein in step c) the second adsorbent has, at 20° C., a Henry constant for CO greater than or equal to 5 (mmol/g)/bar.

9. The process of claim 1, wherein the first and second adsorbents are identical.

10. The process of claim 1, wherein the second adsorbent is of the granular type, and the first adsorbent is of the monolithic type.

11. The process of claim 10, wherein the second adsorbent is in the form of beads or rods.

12. The process of claim 10, wherein the first adsorbent is in the form of sheets.

13. The process of claim 1, wherein the second adsorbent is chosen from an X zeolite.

14. The process of claim 13, wherein the second adsorbent is selected from the group consisting of an LSX zeolite, a 5A zeolite and an exchanged zeolite.

15. The process of claim 13, wherein the second adsorbent is a zeolite exchanged to the extent of more than 50%.

16. The process of claim 1, wherein the downstream adsorber contains at least two different adsorbent materials.

17. The process of claim 1, wherein the feed gas stream is obtained by a process selected from the group consisting of steam reforming, partial oxidation of hydrocarbons, partial oxidation of alcohols, gasification of coal, gasification of residues, and mixed processes.

18. The process of claim 1, wherein gas coming from step d) is intended for a network of the pipeline type, a chemical unit, a petrochemical unit, a unit forming part of a refinery or for feeding a fuel cell.

* * * * *